(12) United States Patent
Gao et al.

(10) Patent No.: US 11,584,675 B2
(45) Date of Patent: Feb. 21, 2023

(54) PROCESSING FIXTURE

(71) Applicant: BEIJING XIAOMI MOBILE SOFTWARE CO., LTD., Beijing (CN)

(72) Inventors: Jing Gao, Beijing (CN); Xun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 185 days.

(21) Appl. No.: 16/846,453

(22) Filed: Apr. 13, 2020

(65) Prior Publication Data

US 2021/0163335 A1 Jun. 3, 2021

(30) Foreign Application Priority Data

Nov. 29, 2019 (CN) .......................... 201911204833.9

(51) Int. Cl.
   *C03B 23/033* (2006.01)
   *C03B 23/03* (2006.01)

(52) U.S. Cl.
   CPC ........ *C03B 23/033* (2013.01); *C03B 23/0307* (2013.01); *Y10T 156/1744* (2015.01)

(58) Field of Classification Search
   None
   See application file for complete search history.

(56) References Cited

U.S. PATENT DOCUMENTS

| | | | | |
|---|---|---|---|---|
| 2009/0277578 A1* | 11/2009 | Sung | .................... | G06F 3/03543 156/285 |
| 2015/0258759 A1* | 9/2015 | Kim | ...................... | B32B 37/003 156/60 |
| 2016/0174423 A1* | 6/2016 | Oh | ........................... | G02F 1/13 445/25 |

FOREIGN PATENT DOCUMENTS

| CN | 209401249 U | 9/2019 |
|---|---|---|
| KR | 101583341 B1 | 1/2016 |

OTHER PUBLICATIONS

Extended European Search Report in Application No. 20171862.4, dated Oct. 29, 2020.

* cited by examiner

*Primary Examiner* — Lisa L Herring
(74) *Attorney, Agent, or Firm* — Syncoda LLC; Feng Ma (57) ABSTRACT

A processing fixture can be employed for processing a glass cover plate and include: a fixture body, a first sensing component, a roller component, and a control module connected with the first sensing component. The fixture body is made from flexible materials and provided with a positioning groove matched with shape of an outer surface of the glass cover plate. The first sensing component is configured to detect current dimension parameter of the glass cover plate and/or an attaching layer attached to the glass cover plate in the positioning groove, and transmit the detected current dimension parameter to the control module. The control module is configured to control cooperation of the roller component and the fixture body according to the current dimension parameter, so as to correct the current dimension parameter of the glass cover plate or the attaching layer as a target dimension parameter.

20 Claims, 6 Drawing Sheets

PROCESSING FIXTURE

CROSS-REFERENCE TO RELATED APPLICATION

This application claims priority to Chinese Patent Application No. 201911204833.9 filed on Nov. 29, 2019, the disclosure of which is hereby incorporated by reference in its entirety.

BACKGROUND

With the development of mobile terminal technologies, display screens such as full screens and flexible screens have been more and more widely used in mobile terminals. A display screen typically includes a glass cover plate and a display body attached to the glass cover plate. The display body is formed by stacking layers of formula materials.

SUMMARY

The present disclosure relates generally to the technical field of processing, more specifically to a processing fixture.

According to a first aspect of the embodiments of the present disclosure, there is provided a processing fixture, used for processing a glass cover plate, including:

a fixture body made from flexible materials, provided with a positioning groove which is matched with shape of an outer surface of the glass cover plate and a first sensing component which is configured to detect current dimension parameter of the glass cover plate and/or an attaching layer attached to the glass cover plate in the positioning groove and transmit the detected current dimension parameter to the control module;

a roller component capable of moving relative to the fixture body; and a control module connected with the first sensing component and configured to control cooperation of the roller component and the fixture body according to the current dimension parameter, so as to correct the current dimension parameter of the glass cover plate or the attaching layer as a target dimension parameter.

In some embodiments, the first sensing component is disposed on the fixture body and attached to a surface of the positioning groove; or the first sensing component is disposed in the fixture body and a sensing surface of the first sensing component is parallel to the surface of the positioning groove.

In some embodiments, the positioning groove is formed by being recessed from a surface of the fixture body and includes a bottom wall, at least one side wall, and a curved wall connecting the bottom wall and the at least one side wall; and the first sensing component is extended along a direction from the bottom wall to the side wall of the positioning groove.

In some embodiments, the processing fixture further includes a first heating component disposed in the fixture body and connected with the control module; and the control module is configured to control a heating operation of the first heating component according to the current dimension parameter detected by the first sensing component, so as to control expansion of corresponding part of the fixture body to correct the current dimension parameter of the glass cover plate or the attaching layer.

In some embodiments, the first heating component includes a plurality of dotted heating points uniformly distributed on the fixture body in a dotted array; and/or the first heating component includes a plurality of linear heating bars distributed on the fixture body in a parallel linear form or in a staggered form; and/or the first heating component includes a plurality of heating blocks laid on the fixture body.

In some embodiments, a heating surface of the first heating component is parallel to the surface of the positioning groove.

In some embodiments, an outer surface of the fixture body is parallel to the surface of the positioning groove.

In some embodiments, the curved wall of the positioning groove is an arc-shaped chamfer angle; and gyration radius of the roller component is less than the minimum radius of the arc-shaped chamfer angle.

In some embodiments, the roller component includes a roller body and a second heating component mounted on the roller body and connected with the control module; and the control module is configured to control heating operation of the second heating component according to the current dimension parameter detected by the first sensing component, so as to control expansion of corresponding part of the fixture body to correct the current dimension parameter of the glass cover plate or the attaching layer.

In some embodiments, the first sensing component is configured to detect dimension parameter of an outer surface of the glass cover plate; the roller component includes a roller body, a second heating component mounted on the roller body and a second sensing component mounted on the roller body and configured to detect the dimension parameter of an inner surface of the glass cover plate; both the second heating component and the second sensing component are connected with the control module; and the control module is configured to control heating operation of the second heating component according to the dimension parameter of the inner surface detected by the second sensing component, so as to control expansion of corresponding part of the fixture body to correct the dimension parameter of the glass cover plate or the attaching layer.

In some embodiments, the roller body is made from flexible materials.

In some embodiments, the second heating component includes a plurality of dotted heating points uniformly distributed on the roller body in a dotted array; and/or the second heating component includes a plurality of linear heating bars distributed on the roller body in a parallel linear form or in a staggered form; and/or the second heating component includes a plurality of heating blocks laid on the roller body.

In some embodiments, the second heating component is rolled in the roller body.

In some embodiments, a heating surface of the second heating component and an outer circumference of the roller body are arranged in shape of concentric circles; and/or the second heating component is disposed in an area encircled by the second sensing component.

In some embodiments, the processing fixture further includes an adjusting component connected with the control module; the roller component is mounted to the adjusting component; and the adjusting component is configured to adjust spacing between an outer circumference of the roller component and a surface of the positioning groove.

In some embodiments, the adjusting component drives the roller component to translate and/or rotate.

It should be understood that the above general description and the following detailed description are exemplary and explanatory, and are not intended to limit the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Terms used in this disclosure are only for the purpose of describing specific embodiments instead of limiting this disclosure. The singular forms "a/an," "the" and "said" used in this disclosure and the attached claims are intended to include the plural forms, unless the context clearly indicates otherwise. It should be understood that terms "and/or" used herein refers to and comprises any or all possible combinations of one or more of the associated listed items.

It should be understood that, although the terms "first," "second" and "third," etc. may be used in the disclosure to describe various information, this information should not be limited by these terms. These terms are only used to distinguish same type of information from each other. For example, without departing from the scope of this disclosure, first information may be referred to as second information. Similarly, the second information may be referred to as the first information. Based on the context, for example, a word "if" used herein may be construed as "while/as" or "when" or "in response to determining."

Typically, processing the display screen can includes the following steps: firstly, assembling the glass cover plate in a fixture; and secondly, stacking and processing layers of formula materials of a display body on the glass cover plate.

Due to the processing technology of the glass cover plate, the inner side and outer side tolerances of the glass cover plate are relatively large, especially the 3D glass cover plate and the four-sided curved glass cover plate. However, the fixture is made from rigid materials such as composite metal materials with stable dimension and hard texture. Due to the large tolerance range of the glass cover plate, the glass cover plate is prone to be unevenly bonded on the fixture and broken or even damaged under the action of extrusion pressure, which causes the display body to be unevenly bonded to the glass cover plate.

Various embodiments of the present disclosure can address that the glass cover plate is prone to be unevenly bonded on the fixture and the display body is to be unevenly bonded to the glass cover plate.

Figure 1:
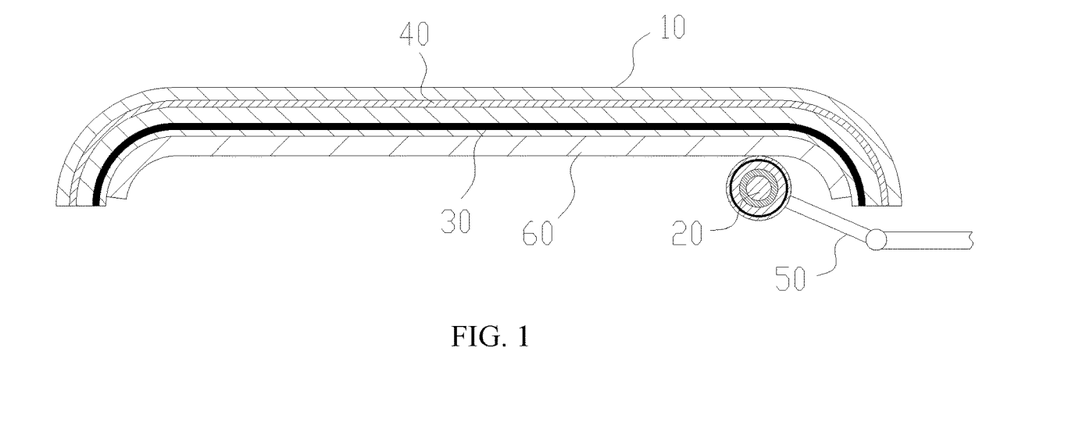
FIG. 1 is a schematic structural sectional view illustrating a case that a roller component presses a glass cover plate disposed in a fixture body in accordance with some embodiments.
Figure 2:
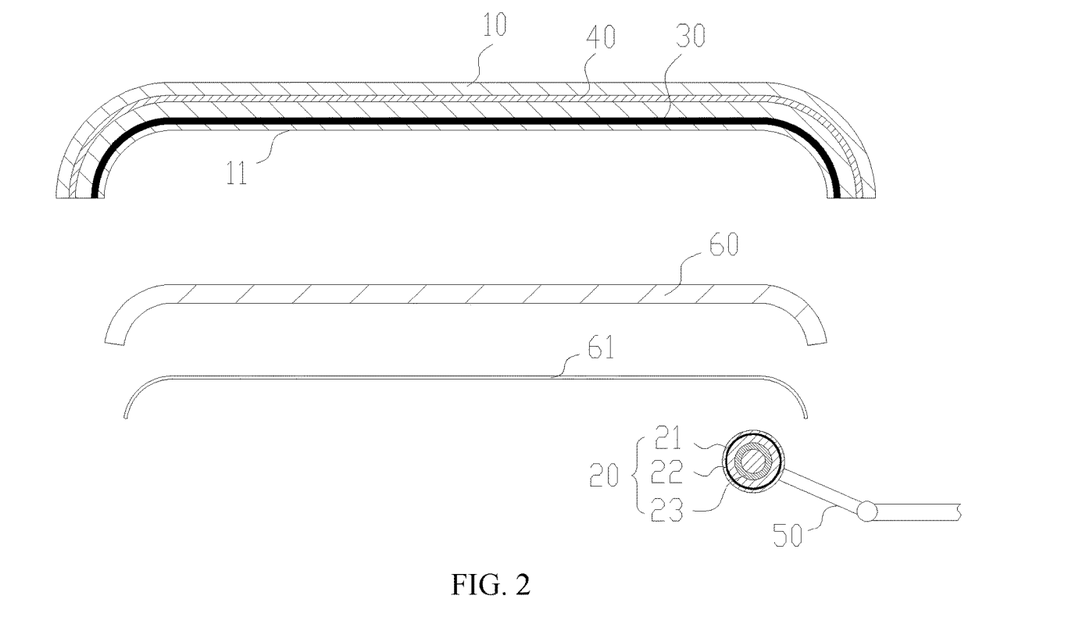
FIG. 2 is a schematic structural sectional diagram illustrating a display screen to be processed by a processing fixture in accordance with some embodiments.

Referring to FIGS. 1 and 2, a processing fixture is used for processing a glass cover plate 60. For example, the glass cover plate 60 includes flat glass, 3D curved glass, four-sided curved glass, etc. In some embodiments, the edge of the glass cover plate 60 is curved to form a bending structure, and the glass cover plate 60 includes a main plane, a side wall, and an arc-shaped connecting wall connecting the main plane and the side wall. A display screen also includes an attaching layer 61 attached to the glass cover plate 60, e.g., an attaching layer 61 formed by stacking and processing formula materials of a flexible display screen to the glass cover plate 60.

The processing fixture comprises a fixture body 10, a first sensing component 30 disposed on the fixture body 10, a roller component 20 capable of moving relative to the fixture body 10, and a control module connected with the first sensing component 30 and the roller component 20. The fixture body 10 is made from flexible materials and provided with a positioning groove 11 which is matched with the shape of an outer surface of the glass cover plate 60. The first sensing component 30 is configured to detect the current dimension parameter of the glass cover plate 60 and/or the attaching layer 61 attached to the glass cover plate 60 in the positioning groove 11, and transmit the detected current dimension parameter to the control module. The control module is configured to control the cooperation of the roller component 20 and the fixture body 10 according to the current dimension parameter, so as to correct the current dimension parameter of the glass cover plate 60 or the attaching layer 61 attached to the glass cover plate 60 as the target dimension parameter.

In some embodiments, the fixture body 10 is formed by silicone, resin, rubber and other flexible materials, and has stable overall dimension and shape when not applied by an external force. The positioning groove 11 is formed by being recessed from a surface of the fixture body 10, and the shape of the positioning groove 11 is matched with the standard dimension parameter of the glass cover plate 60 to be processed. Alternatively, at least a part of inner wall of the positioning groove 11 is matched with the standard dimension parameter of the glass cover plate 60. The glass cover plate 60 is assembled in the positioning groove 11, and the outer surface of the glass cover plate 60 is bonded to the inner wall of the positioning groove 11, so that the fixture body 10 can limit and support the glass cover plate 60.

In some embodiments, the fixture body 10 is provided with the first sensing component 30 so as to detect the dimension and shape parameters of the outer surface of the glass cover plate 60 in the positioning groove 11. Alternatively, the first sensing component 30 is disposed on the fixture body 10 and the first sensing component 30 is attached to a surface of the positioning groove 11 such that the glass cover plate 60 can be attached to the first sensing component 30. Alternatively, the first sensing component 30 is disposed in the fixture body 10 and a sensing surface of the first sensing component 30 is parallel to the surface of the positioning groove 11 such that the glass cover plate 60 is attached to the surface of the positioning groove 11 and the first sensing component 30 can detect the current dimension parameter and the current shape parameter of the glass cover plate 60. In the present embodiment, the sensing surface of the first sensing component 30 is parallel to the surface of the positioning groove 11, in which "parallel" arrangement indicates that the vertical distance between a plurality of sensing points or sensing areas on the sensing surface of the first sensing component 30 and the surface of the positioning groove 11 is equal.

Figure 3:
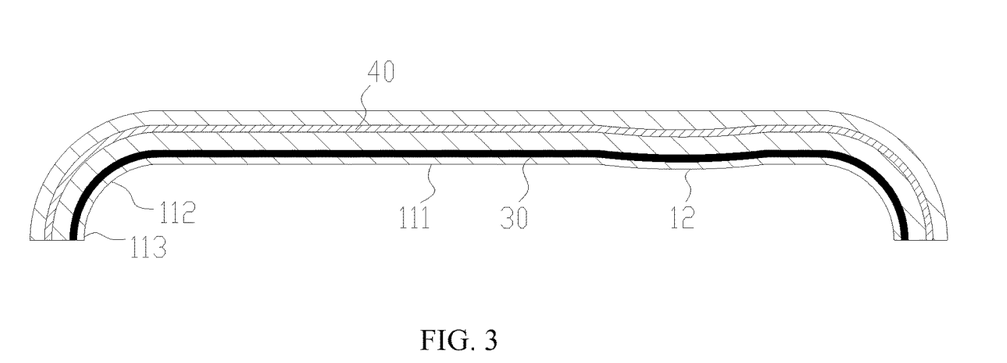
FIG. 3 is a schematic structural sectional view illustrating a case that the fixture body is locally expanded under the heating of a first heating component in accordance with some embodiments.

As shown in FIG. 3, in some embodiments, inner wall of the positioning groove 11 includes a bottom wall 111, at least one side wall 113, and a curved wall 112 connecting the bottom wall 111 and the at least one side wall 113. The first sensing component 30 is extended along a direction from the bottom wall 111 to the side wall 113. The sectional shape of the inner wall of the positioning groove 11 is similar to the "U" and "L" shape, and a curved corner is in arc shape. The sensing range of the first sensing component 30 includes the bottom wall 111, the curved wall 112 and the side wall 113, so that the outer surface of the glass cover plate 60 is within the sensing range of the first sensing component 30. Accordingly, the current dimension parameter and the current shape parameter of the glass cover plate 60 can be comprehensively detected with complete data.

For example, the first sensing component 30 is a pressure-sensitive sensor, an infrared sensor or other sensors for testing dimensions. The first sensing component 30 is distributed in or on the fixture body 10 and forms a test reference, for detecting the overall dimension and local deformation of the attaching layer 61 and/or the glass cover plate 60 assembled on the fixture body 10. For example, the dimension parameter of the glass cover plate 60 and/or the attaching layer 61 detected by the first sensing component 30 includes curvature size, flatness size, outer contour size, deformation size caused by local recession or protrusion, and the like.

The first sensing component 30 transmits the detected current dimension parameter of the glass cover plate 60 to the control module, and the control module generates corresponding correction parameter by comparing the current dimension parameter with the standard dimension. The correction parameter may be used for correcting the local dimension of the glass cover plate 60, so as to correct the current dimension parameter of the glass cover plate 60 or the attaching layer 61 as the target dimension parameter, thereby improving the attaching effect between the attaching layer 61 and the glass cover plate 60. In accordance with the correction parameter, the control module controls the roller component 20 to move relative to the positioning groove 11 along a motion trajectory conforming to correction value of the correction parameter. The roller component 20 presses the inner surface of the glass cover plate 60 to modify the dimension of the glass cover plate 60. In some embodiments, the roller component 20 may perform rotation pressing and/or translation pressing relative to the surface of the glass cover plate 60 so as to modify the current dimension parameter of the glass cover plate 60.

In one preferred embodiment, the roller component 20 can press the glass cover plate 60 or the attaching layer 61 so as to control the distance relative to the positioning groove 11 under the control of the control module. In some embodiments, the processing fixture also comprises an adjusting component 50 connected with the control module; the roller component 20 is mounted on the adjusting component 50 such that a spacing between the outer circumference of the roller component 20 and the surface of the positioning groove 11 is adjustable. In the embodiment, the adjusting component 50 drives the roller component 20 to translate and/or rotate.

In some embodiments, the adjusting component 50 can adjust the position of the roller component 20 and further corresponding spacing between the outer circumference of the roller component 20 and the surface of the positioning groove 11 in accordance with the processing steps of the processing fixture. For example, when the roller component 20 is used for modifying the dimension parameter of the glass cover plate 60, the adjusting component 50 controls the roller component 20 to be at a position where the distance of the roller component 20 from the surface of the positioning groove 11 is the wall thickness of the glass cover plate 60. When the roller component 20 is used for pressing the attaching layer 61 to the glass cover plate 60, the adjusting component 50 controls the roller component 20 to be at a position where the distance of the roller component 20 from the surface of the positioning groove 11 is the wall thickness of the glass cover plate 60 and the attaching layer 61. In some embodiments, the adjusting component 50 may adopt a manipulator structure, a connecting rod structure, etc.

In the embodiments of the present disclosure, the fixture body 10, made from flexible materials, not only can support and position the glass cover plate 60, but also can avoid the surface damage and breakage of the glass cover plate 60, thereby having good positioning and protection effects. The first sensing component 30 is disposed on or in the fixture body 10 and configured to detect the current dimension parameter of the outer surface of the glass cover plate 60, so that the control module can control the roller component 20 and the fixture body 10 to press the glass cover plate 60 and modify the current dimension parameter of the glass cover plate 60 as the target dimension parameter, thereby improving the processing precision of the display screen and having excellent processing effect.

Referring to FIGS. 1 and 3, the roller component 20 presses and modifies the glass cover plate 60 so that the glass cover plate 60 can be attached to the fixture body 10. In some embodiments, the processing fixture also comprises a first heating component 40 disposed in the fixture body 10 and connected with the control module. The control module is configured to control the first heating component 40 to perform local heating according to the current dimension parameter detected by the first sensing component 30, so as to control the expansion of corresponding part of the fixture body 10 to correct the current dimension parameter of the glass cover plate 60 and/or the attaching layer 61.

In some embodiments, the first heating component 40 is disposed in the fixture body 10 and can heat corresponding part of the fixture body 10 when electrified, so that corresponding area of the fixture body 10 is expanded with heat to form an expanding protrusion 12 and restored after cooling. In some embodiments, the expanding protrusion 12 of the fixture body 10 is tightly attached to the glass cover plate 60 with excellent support effect. In some embodiments, the glass cover plate 60 is locally protruded, and the expanding protrusion 12 of the fixture body 10 encircles the protrusion. The roller component 20 presses corresponding protrusion of the glass cover plate 60 to modify the planarity of the glass cover plate 60, thereby improving the attaching flatness of the attaching layer 61.

The control module is connected with the first heating component 40 to control the heating area and the heating temperature range of the first heating component 40, so as to control the expansion range of the fixture body 10. The control module controls the expansion of corresponding part of the fixture body 10 according to the current dimension parameter of the glass cover plate 60 detected by the first sensing component 30, so as to cooperate with the roller component 20 to modify the glass cover plate 60. Thus, the correction effect is excellent.

Figure 4:
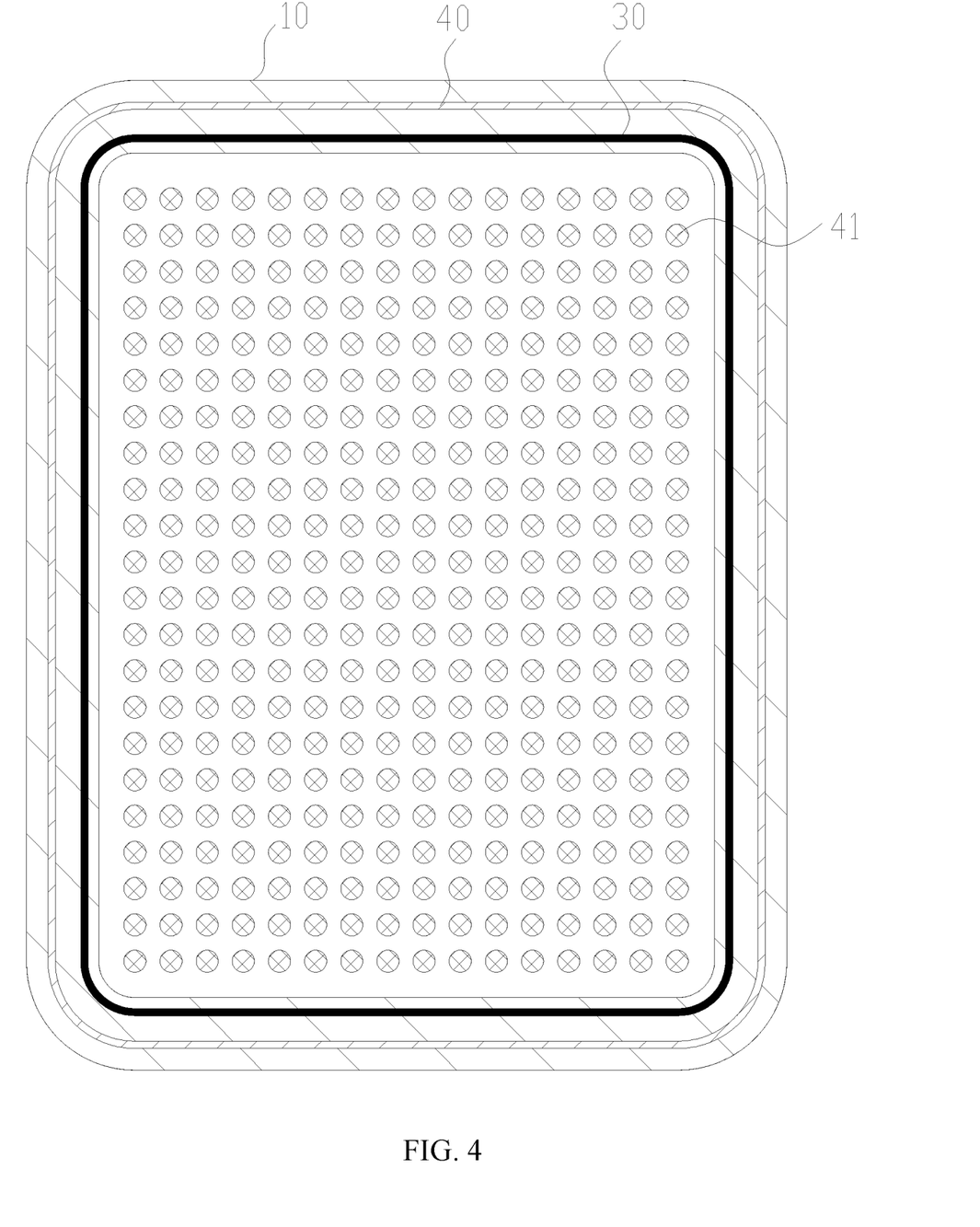
FIG. 4 is a schematic structural sectional view illustrating a case that the first heating component is disposed on the fixture body in the form of heating points in accordance with some embodiments.
Figure 5:
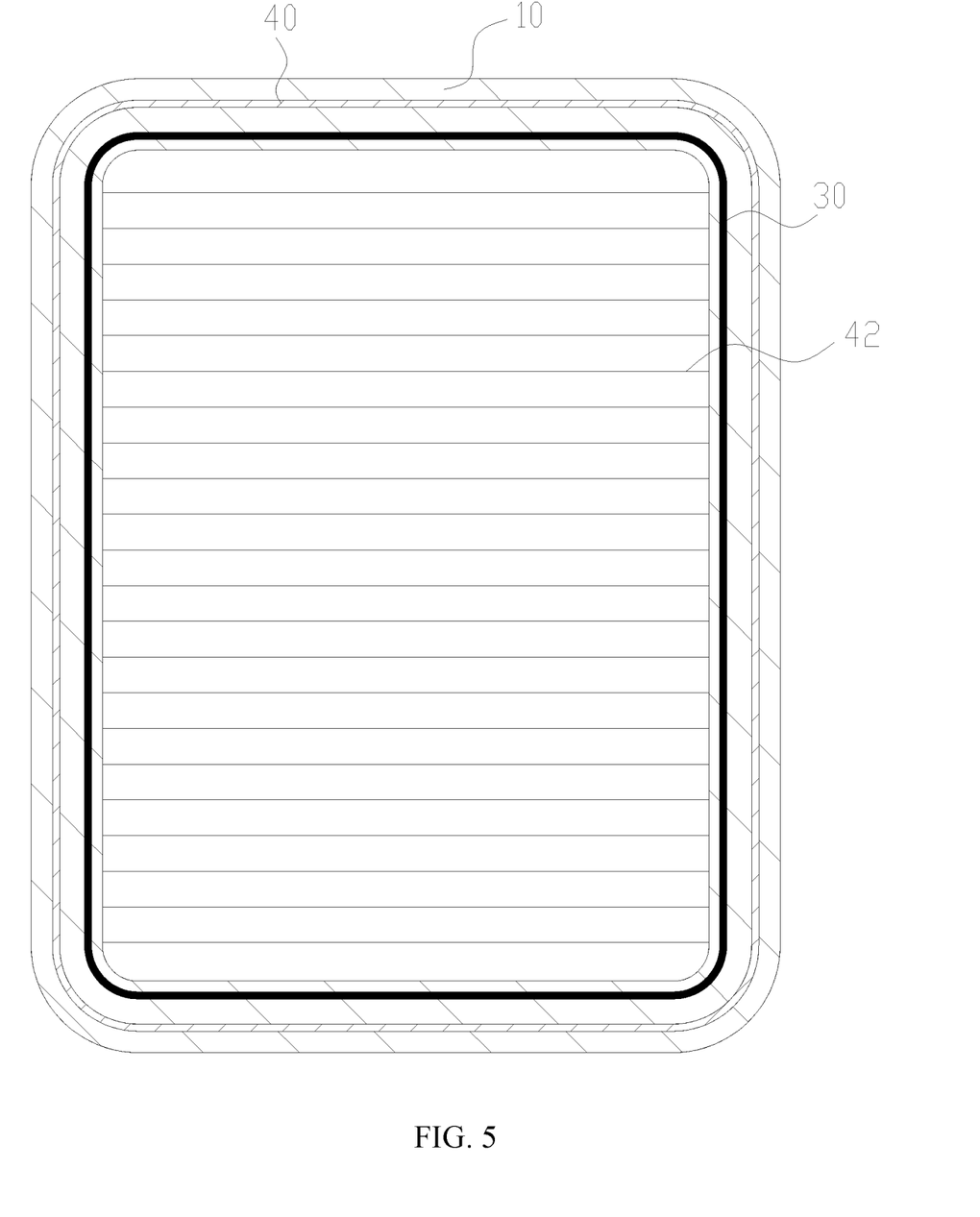
FIG. 5 is a schematic structural sectional view illustrating a case that the first heating component is disposed on the fixture body in the form of heating bars in accordance with some embodiments.
Figure 6:
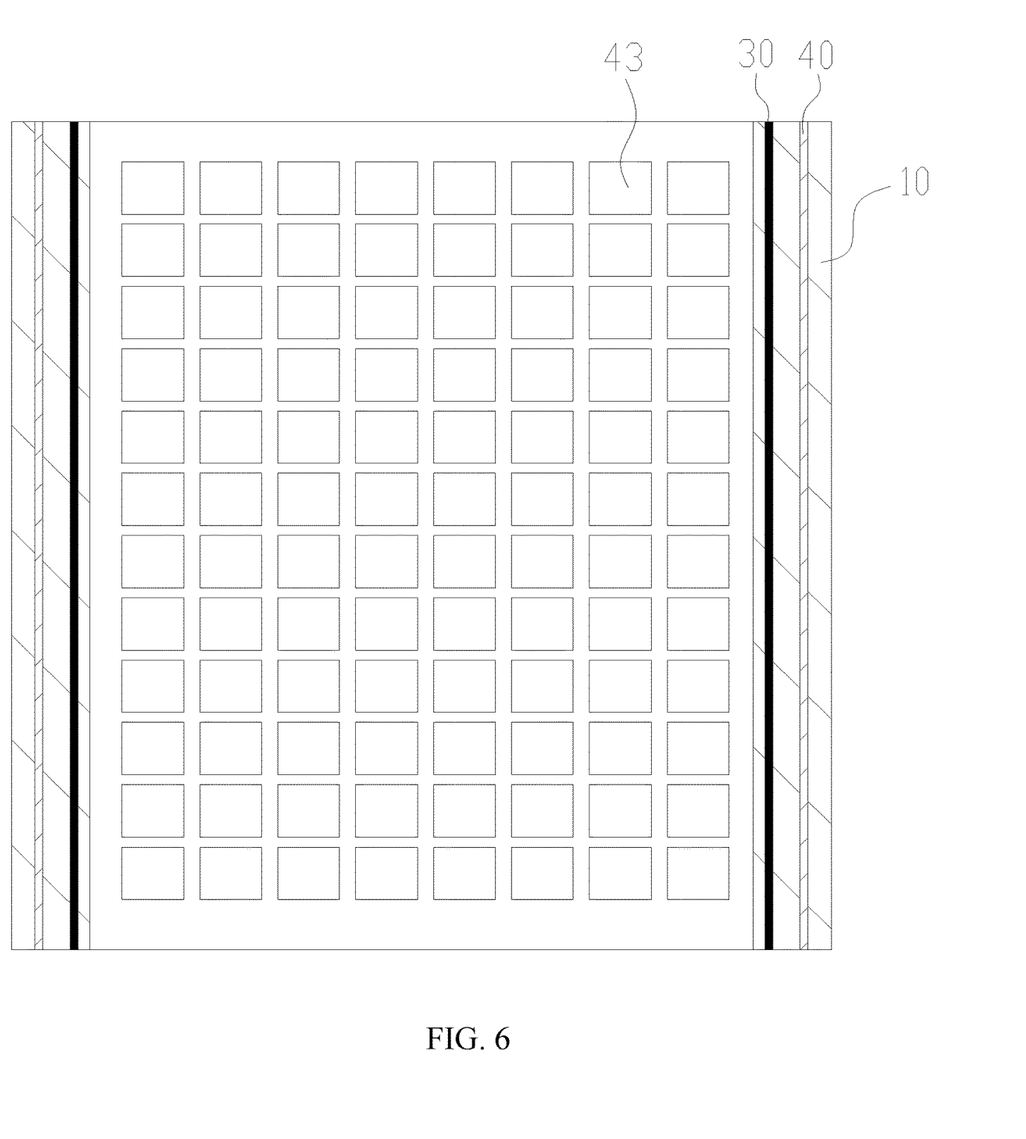
FIG. 6 is a schematic structural sectional view illustrating a case that the first heating component is disposed on the fixture body in the form of heating blocks in accordance with some embodiments.

Some embodiments of the first heating component will be illustrated hereinafter based on FIG. 3 with reference to FIGS. 4, 5 and 6 respectively. FIGS. 4, 5 and 6 are a bottom view of the assembly structure of FIG. 3 in a non-expanded state, wherein some portions of the fixture body 10 and the first sensing component 30 in an area corresponding to the bottom wall 111 of the positioning groove 11 are removed to expose the various arrangements of the first heating component, for the purpose of ease and convenience in description and illustration.

Referring to FIGS. 3 and 4, the control module controls the first heating component 40 to perform local heating so as to adjust the local expansion deformation of the fixture body 10. In some embodiments, the first heating component 40 includes a plurality of dotted heating points 41, and the heating points 41 are uniformly distributed on the fixture body 10 in a dotted array. The plurality of heating points 41 are distributed on the fixture body 10 at intervals to form regularly distributed heating parts. For example, the plurality of heating points 41 are distributed on the fixture body 10 at equally spaced intervals so that the fixture body 10 is heated and subjected to expansion in the form of salient points, in which centers of every four heating points 41 form a quadrangle. Or the plurality of heating points 41 are alternately distributed on the same straight line, and two adjacent straight lines are in parallel. In this embodiment, since the first heating component 40 is configured to be the heating points 41 distributed on the fixture body 10, and the control module can control one or more heating points 41 to heat the fixture body 10 to realize the local expansion of different parts of the fixture body 10, heating areas can be flexibly controlled. It should be noted that the heating temperature of each heating point 41 may be same or different to form different expansion capacities, and the correction degree on the glass cover plate 60 by the fixture body 10 is flexibly adjusted. Although FIG. 4 shows that the heating points 41 are arranged only in the area corresponding to the bottom wall 111 of the positioning groove 11, the heating points 41 may also be arranged in other areas corresponding to the side wall 113 and the curved wall 112 of the positioning groove 11.

Referring to FIGS. 3 and 5, in some embodiments, the first heating component 40 includes a plurality of linear heating bars 42 distributed on the fixture body 10 on the fixture body 10 in a parallel linear form or in a staggered form. The plurality of heating bars 42 are distributed on the fixture body 10 at intervals to form regularly distributed linear heating parts. For example, the plurality of heating bars 42 are distributed in parallel on the fixture body 10. Or the heating bars 42 are distributed on the fixture body 10 in the layout form of circular distribution, curved distribution, concentric circle, etc. Or the heating bars 42 are distributed on the fixture body 10 in the form of line segments, so that the fixture body 10 is heated and expanded in the form of ribs, such that the correction degree on the glass cover plate 60 is controllable. Alternatively, the heating bars 42 are staggered to form a grid structure, so that controllable heating expansion can be generated in both the transverse direction and longitudinal direction of the fixture body 10. In this embodiment, since the first heating component 40 is configured to be the heating bars 42 distributed on the fixture body 10, and the control module can control one or more heating bars 42 to heat the fixture body 10 to realize the local expansion of different parts of the fixture body 10, heating areas are flexibly controlled. Similarly, the heating temperature of each heating bar 42 may be same or different to form different expansion capacities, and the correction degree of the fixture body 10 on the glass cover plate 60 is flexibly adjusted. Although FIG. 5 shows that the heating bars 42 are arranged only in the area corresponding to the bottom wall 111 of the positioning groove 11, the heating bars 42 may also be arranged in other areas corresponding to the side wall 113 and the curved wall 112 of the positioning groove 11.

Referring to FIGS. 3 and 6, in some embodiments, the first heating component 40 includes a plurality of heating blocks 43 laid on the fixture body 10. The plurality of heating blocks 43 are alternately distributed on the fixture body 10 to form regularly distributed blocky heating parts. For example, the heating blocks 43 may be distributed in regular patterns such as rectangles, circles, diamonds or the like, or in other irregular patterns such as polygons with curved edges. In some embodiments, the heating blocks 43 are positioned close to each other to form a continuous laying surface, and two adjacent heating blocks 43 form a complementary structure. In some embodiments, the heating blocks 43 are spaced from each other to form discrete structures, and structures of two adjacent heating blocks 43 may be same or different. The heating blocks 43 are distributed on the fixture body 10 in blocky form, so that the fixture body 10 is heated and expanded in the form of projections, and the correction degree on the glass cover plate 60 is controllable. In this embodiment, since the first heating component 40 is configured to be the heating blocks 43 distributed on the fixture body 10, and the control module can control one or more heating blocks 43 to heat the fixture body 10 to realize the local expansion of different parts of the fixture body 10, so heating areas are flexibly controlled. Similarly, the heating temperature of each heating block 43 may be same or different to form different expansion capacities, and the correction degree on the glass cover plate 60 by the fixture body 10 is flexibly adjusted. Although FIG. 6 shows that the heating blocks 43 are arranged only in the area corresponding to the bottom wall 111 of the positioning groove 11, the heating blocks 43 may also be arranged in other areas corresponding to the side wall 113 and the curved wall 112 of the positioning groove 11.

The first heating component 40 is mounted in the fixture body 10 and can heat the fixture body 10 under the control of the control module, and an expanding part of the fixture body 10 is cooperated with the glass cover plate 60 mounted in the positioning groove 11 to correct the deformation of the glass cover plate 60. Herein, the first heating component 40 may be formed by a plurality of heating elements, and the position of each heating element in the fixture body 10 may be correspondingly adjusted to realize different heating effects. Correspondingly, the fixture body 10 may output different expansion variations. For example, the distance from the heating element to the surface of the positioning groove 11 is gradually increased or decreased in a direction from the curved wall 112 to a center of the bottom wall 111. In some embodiments, the heating surface of the first heating component 40 is parallel to the surface of the positioning groove 11. A curved surface where the heating surface of the first heating component 40 is positioned and the surface of the positioning groove 11 are arranged in parallel, so that the vertical distance from each heating point 41 on the heating surface of the first heating component 40 to the surface of the positioning groove 11 is same, and the expansion capacity of the fixture body 10 under same heat quantity is same, such that the controllable precision of the correction degree is high. In the embodiment, the description that the surface of the first heating component 40 is parallel to the surface of the positioning groove 11 indicates that the vertical distance between the surface of the first heating component 40 and the surface of the positioning groove 11 is equal.

In some embodiments, the first sensing component 30 is disposed on the fixture body 10 and leveled with the surface of the positioning groove 11, or is disposed in the fixture body 10 spaced from and parallel to the surface of the positioning groove 11. The first heating component 40 is disposed in the fixture body 10 and spaced and parallel to the surface of the positioning groove 11. In some embodiments, the first sensing component 30 and the first heating component 40 are spaced in parallel, and the first heating component 40 is disposed on the outer of the first sensing component 30. The first heating component 40 is to heat and expand the fixture body 10 towards the first sensing component 30, such that the heating effect is excellent.

The fixture body 10 is provided with the positioning groove 11 to support and limit the glass cover plate 60, and the shape of the fixture body 10 may be set as required. For example, the fixture body 10 is set to be a prism, a pillar, and other block structures, and one surface of the fixture body 10 is recessed to form the positioning groove 11. In some embodiments, the outer surface of the fixture body 10 is parallel to the surface of the positioning groove 11 to form the fixture body 10 with uniform wall thickness, such that the overall deformation effect and the consistency of the thermal expansion coefficient are excellent. In some embodiments, the fixture body 10 is mounted as a whole in a rigid fixing support to maintain the stable shape of the outer surface. In the embodiment, the outer surface of the fixture body 10 is parallel to the surface of the positioning groove 11, in which "parallel" arrangement indicates that the vertical distance between the surface of the outer surface of the fixture body 10 and the surface of the positioning groove 11 is equal, namely the fixture body 10 is a member with uniform thickness.

The roller component 20 can attach and press any part of the inner surface of the glass cover plate 60, so as to modify the glass cover plate 60. In some embodiments, the positioning groove 11 is provided with an arc-shaped chamfer angle, and the gyration radius of the roller component 20 is less than the minimum radius of the arc-shaped chamfer angle (rounded corner). The rounded corner is the curved wall 112 of the positioning groove 11, and the gyration radius of the roller component 20 is less than the gyration radius of the curved wall 112, such that the roller component 20 can press the glass cover plate 60 placed in the positioning groove 11 to modify the current dimension parameter at the connecting wall of the glass cover plate 60 and correct the attaching effect of the attaching layer 61 attached to the connecting wall.

The roller component 20 can press against the inner surface of the glass cover plate 60 to modify the current dimension parameter of the glass cover plate 60. In some embodiments, the roller component 20 includes a roller element attached with a flexible surface, and the roller element can press the glass cover plate 60 under the control of the control module. For example, the roller component 20 is a nylon wheel, a rubber wheel, a silicone wheel, a resin wheel, etc.

Figure 7:
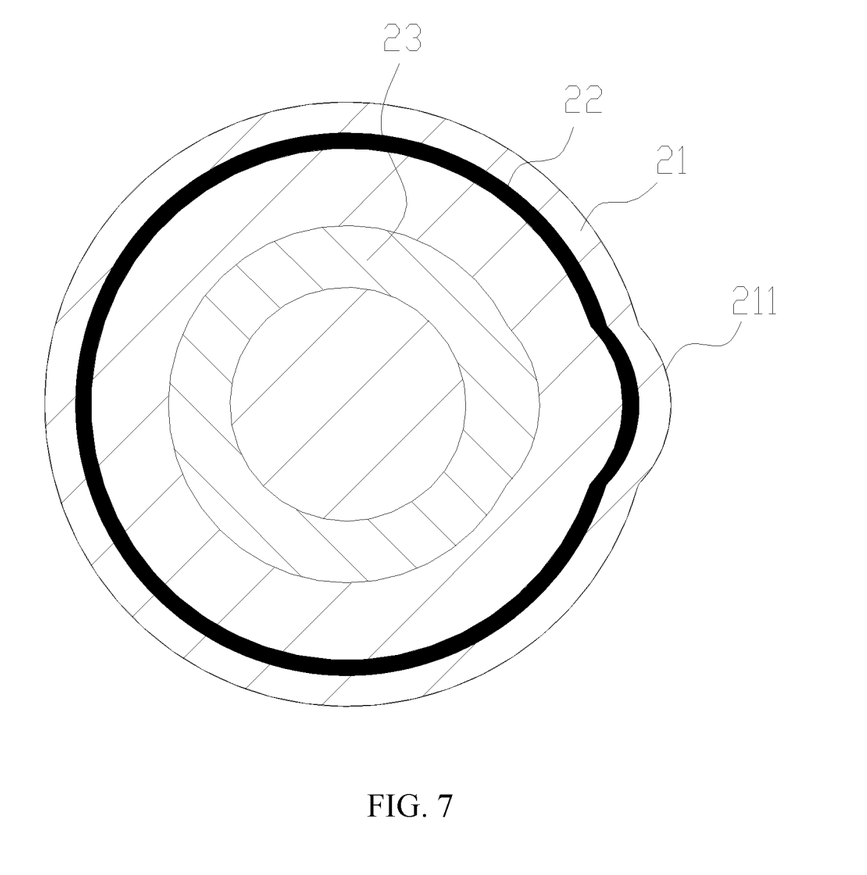
FIG. 7 is a schematic structural view illustrating a case that the roller body is locally expanded under the heating of a second heating component in accordance with some embodiments.

Referring to FIGS. 1 and 7, in some embodiments, the roller component 20 includes a roller body 21 and a second heating component 23 mounted on the roller body 21. The second heating component 23 is connected with the control module, and the control module is configured to control the second heating component 23 to perform local heating according to the current dimension parameter detected by the first sensing component 30, so as to control the expansion of corresponding part of the fixture body 10 to modify the glass cover plate 60. In some embodiments, the roller body 21 is made from flexible materials.

In some embodiments, the roller body 21 is formed by silicone, resin, rubber and other flexible materials, and has stable overall dimension and shape when not applied with an external force. The outer circumference of the roller body 21 can press against the inner surface of the glass cover plate 60, so that the current dimension parameter of the glass cover plate 60 can be modified as the target dimension parameter under the action of the pressure of the roller body 21, and the attaching tightness of the attaching layer 61 and the glass cover plate 60 is excellent.

In some embodiments, the second heating component 23 is disposed in the roller body 21 and can heat corresponding part of the roller body 21 when electrified, such that corresponding area of the roller body 21 is expanded with heat to form a positioning protrusion 211. In some embodiments, the positioning protrusion 211 formed by expansion on the outer circumference of the roller body 21 is attached to the glass cover plate 60, so that the glass cover plate 60 is locally pressed and contacted to realize the local correction of the glass cover plate 60. After the local correction of the glass cover plate 60, the outer circumference of the roller body 21 is attached to the glass cover plate 60 to realize the overall correction of the glass cover plate 60, such that the correction effect is excellent. In some embodiments, the glass cover plate 60 is locally protruded, and the positioning protrusion 211 of the roller body 21 presses the projection to correct the planarity of the glass cover plate 60, thereby improving the attaching flatness of the attaching layer 61.

In some embodiments, the control module is in communication connection with the second heating component 23 to control the expansion range of the roller body 21 by control of the heating area and the heating temperature range of the second heating component 23.

In another embodiment, the first sensing component 30 is configured to detect the dimension parameter of the outer surface of the glass cover plate 60. The roller component 20 includes a roller body 21 and a second heating component 23 and a second sensing component 22 mounted on the roller body 21, and the second sensing component 22 is configured to detect the dimension parameter of the inner surface of the glass cover plate 60. Both the second heating component 23 and the second sensing component 22 are connected with the control module, and the control module controls the second heating component 23 to perform local heating according to the dimension parameter of the inner surface detected by the second sensing component 22, so as to control the expansion of corresponding part of the fixture body 10 to correct the dimension parameter of the glass cover plate 60 or the attaching layer 61. The roller component 20 is further provided with the second sensing component 22, and the second sensing component 22 is configured to sense the dimension parameter of the inner surface of the glass cover plate 60, so as to correct the dimension parameter of the inner surface of the glass cover plate 60. Accordingly, both the dimension of the inner surface and the outer surface of the glass cover plate 60 can be corrected. In the embodiment, the control module controls the expansion of corresponding part of the roller body 21 according to the actual dimension parameter of the glass cover plate 60 detected by the second sensing component 22, so as to cooperate with the fixture body 10 to modify the glass cover plate 60. As such, the correction effect is excellent. In some embodiments, the roller body 21 is made from flexible materials.

For example, the roller component 20 presses against the surface of the glass cover plate 60; the first sensing component 30 and the second sensing component 22 detect the current dimension parameters of the outer and inner surface of the glass cover plate 60 respectively and transmit the detected current dimension parameters to the control module. The control module compares the detected current dimension parameter with the standard dimension parameter. If the comparison result meets the preset threshold, the roller component 20 moves to the next detection position. If the comparison result does not meet the preset threshold, the corrected value dimension parameter of the glass cover plate 60 corresponding to the detection position is outputted. The control module controls the first heating component 40 and/or the second heating component 23 to heat and move the roller body 21 relative to the fixture body 10 to modify the glass cover plate 60.

Referring to FIGS. 1 and 7, the second heating component 23 includes the following forms: in some embodiments, the second heating component 23 includes a plurality of dotted heating points (like heating points 41) uniformly distributed on the fixture body 10 in a dotted array. In some embodiments, the second heating component 23 includes a plurality of linear heating bars (like hearing bars 42) distributed on the fixture body 10 in a parallel linear form or in a staggered form. In some embodiments, the second heating component 23 includes a plurality of blocky heating blocks (like hearing blocks 43) laid on the fixture body 10. The second heating component 23 and the first heating component 40 are substantially similar in principle, and the specific distribution form of the second heating component 23 may refer to the layout form of the first heating component 40. The difference therebetween is mainly that the second heating component 23 is annularly distributed in the roller body 21, and the first heating component 40 may be distributed in the fixture body 10 along a curved surface. That is, the second heating component 23 is rolled in the roller body 21, so that the roller body 21 is radially protruded under the heating of the second heating component 23. It should be noted that the roller body 21 is of a column structure, including cylindrical structure, prismatic structure and cylindrical structure with curved surfaces.

In some embodiments, the second heating component 23 is disposed in the roller body 21 and can be controlled by the control module to heat the roller body 21 to realize the expansion of corresponding part of the roller body 21. In some embodiments, the roller body 21 is of a column structure, and the second sensing component 22 is disposed on the outer circumference of the roller body 21. Or the second sensing component 22 is disposed in the roller component in consistent spacing from the outer circumference of the roller body 21, namely the second sensing component 22 and the outer circumference of the roller body 21 are spaced from each other, so that the second sensing component 22 is wrapped by the roller body 21. In some embodiments, the heating surface of the second heating component 23 and the outer circumference of the roller body 21 are arranged in concentric circles, and the second heating component 23 is disposed in an area encircled by the second sensing component 22. The second heating component 23 is close to the center of the roller body 21. In heating state, the roller body 21 is expanded radially outward to adjust the shape and the dimension of the outer circumference of the roller body 20, and accordingly adjust the corrected parameter value of the roller component 20 and the glass cover plate 60, such that the correction effect is excellent. In some embodiments, the roller body 21 is configured to be a spherical structure or a bump dot structure, so as to press against the glass cover plate 60 in curved or dotted shape.

In some embodiments, the processing fixture can be part of a display panel assembly line, in which the glass cover plate 60, after being processed over the process fixture, can be transferred down the assembly line via a conveyor belt or rollers for subsequent processing and assembly to become part of a display panel.

Various embodiments of the present disclosure can have one or more of the following advantages.

The fixture body made from the flexible materials not only can support and position the glass cover plate, but also can avoid the damage and breakage on the surface of the glass cover plate, thereby having good positioning and protection effects. The first sensing component is disposed on the fixture body and configured to detect the current dimension parameter of the outer surface of the glass cover plate, and the control module controls the roller component and the fixture body to modify the current dimension parameter of the glass cover plate and/or the attaching layer as the target dimension parameter, thereby achieving high processing precision and excellent processing effect.

The above description includes part of embodiments of the present disclosure, and is not intended to limit the present disclosure. Any modifications, equivalent substitutions, improvements, etc., within the spirit and principles of the present disclosure, are included in the scope of protection of the present disclosure.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A processing fixture, configured for processing a glass cover plate, comprising:
   a fixture body made from flexible materials, provided with a positioning groove matched with a shape of an outer surface of the glass cover plate, and a first sensor configured to detect a current dimension parameter of the glass cover plate and/or an attaching layer attached to the glass cover plate in the positioning groove and transmit the detected current dimension parameter to a control module, wherein the fixture body is configured to support and position the glass cover plate;
   a roller component capable of moving relative to the fixture body; and
   the control module connected with the first sensor and configured to control cooperation of the roller component and the fixture body according to the current dimension parameter, so as to correct the current dimension parameter of the glass cover plate or the attaching layer as a target dimension parameter.

2. The processing fixture according to claim 1, wherein the first sensor is disposed on the fixture body and attached to a surface of the positioning groove; or the first sensor is disposed in the fixture body and a sensing surface of the first sensor is parallel to the surface of the positioning groove.

3. The processing fixture according to claim 2, wherein the positioning groove is formed by being recessed from a surface of the fixture body and includes a bottom wall, at least one side wall, and a curved wall connecting the bottom wall and the at least one side wall; and the first sensor is extended along a direction from the bottom wall to the side wall of the positioning groove.

4. The processing fixture according to claim 1, wherein the processing fixture further includes a first heating component disposed in the fixture body and connected with the control module; and the control module is configured to control a heating operation of the first heating component according to the current dimension parameter detected by the first sensor, so as to control expansion of corresponding part of the fixture body to correct the current dimension parameter of the glass cover plate or the attaching layer.

5. The processing fixture according to claim 4, wherein the first heating component includes a plurality of dotted heating points uniformly distributed on the fixture body in a dotted array; and/or the first heating component includes a plurality of linear heating bars distributed on the fixture body in a parallel linear form or in a staggered form; and/or the first heating component includes a plurality of heating blocks laid on the fixture body.

6. The processing fixture according to claim 4, wherein a heating surface of the first heating component is parallel to the surface of the positioning groove.

7. The processing fixture according to claim 1, wherein an outer surface of the fixture body is parallel to the surface of the positioning groove.

8. The processing fixture according to claim 1, wherein a curved wall of the positioning groove is an arc-shaped chamfer angle; and a gyration radius of the roller component is less than a minimum radius of the arc-shaped chamfer angle.

9. The processing fixture according to claim 1, wherein the roller component includes a roller body and a second heating component mounted on the roller body and connected with the control module; and the control module is configured to control heating operation of the second heating component according to the current dimension parameter detected by the first sensor, so as to control expansion of corresponding part of the fixture body to correct the current dimension parameter of the glass cover plate or the attaching layer.

10. The processing fixture according to claim 1, wherein
   the first sensor is configured to detect a dimension parameter of an outer surface of the glass cover plate;
   the roller component includes a roller body, a second heating component mounted on the roller body and a second sensor mounted on the roller body and configured to detect a dimension parameter of an inner surface of the glass cover plate;
   both the second heating component and the second sensor are connected with the control module; and
   the control module is configured to control heating operation of the second heating component according to the dimension parameter of the inner surface detected by the second sensor, so as to control expansion of corresponding part of the fixture body to correct the dimension parameter of the glass cover plate or the attaching layer.

11. The processing fixture according to claim 9, wherein the roller body is made from flexible materials.

12. The processing fixture according to claim 9, wherein the second heating component includes a plurality of dotted heating points uniformly distributed on the roller body in a dotted array; and/or the second heating component includes a plurality of linear heating bars distributed on the roller body in a parallel linear form or in a staggered form; and/or the second heating component includes a plurality of heating blocks laid on the roller body.

13. The processing fixture according to claim 9, wherein the second heating component is rolled in the roller body.

14. The processing fixture according to claim 10, wherein a heating surface of the second heating component and an outer circumference of the roller body are arranged in shape of concentric circles; and/or the second heating component is disposed in an area encircled by the second sensor.

15. The processing fixture according to claim 1, wherein the processing fixture further includes an adjusting structure connected with the control module; the roller component is mounted to the adjusting structure; and the adjusting structure is configured to adjust spacing between an outer circumference of the roller component and a surface of the positioning groove.

16. The processing fixture according to claim 15, wherein the adjusting structure drives the roller component to translate and/or rotate.

17. A display panel assembly line comprising the processing fixture according to claim 1, wherein the fixture body is made from the flexible materials selected for supporting and positioning the glass cover plate, while avoiding damage and breakage on the outer surface of the glass cover plate.

18. The display panel assembly line according to claim 17, wherein
   an inner wall of the positioning groove includes a bottom wall, at least one side wall, and a curved wall connecting the bottom wall and the at least one side wall; the first sensor is extended along a direction from the bottom wall to the side wall;
   a sectional shape of the inner wall of the positioning groove is "U" or "L" shaped with a curved corner in an arc shape; and
   a sensing range of the first sensor includes the bottom wall, the curved wall and the side wall, such that the outer surface of the glass cover plate is within the sensing range of the first sensor, and the current dimension parameter and a current shape parameter of the glass cover plate are comprehensively detected with complete data.

19. The display panel assembly line according to claim 18, wherein
   the first sensor is configured to detect a dimension parameter of the outer surface of the glass cover plate;
   the roller component includes a roller body, a second heating component mounted on the roller body and a second sensor mounted on the roller body and configured to detect a dimension parameter of an inner surface of the glass cover plate; both the second heating component and the second sensor are connected with the control module; and
   the control module is configured to control heating operation of the second heating component according to the dimension parameter of the inner surface detected by the second sensor, so as to control expansion of corresponding part of the fixture body to correct the dimension parameter of the glass cover plate or the attaching layer.

20. The display panel assembly line according to claim 19, wherein the second heating component includes a plurality of dotted heating points uniformly distributed on the roller body in a dotted array; and/or the second heating component includes a plurality of linear heating bars distributed on the roller body in a parallel linear form or in a staggered form; and/or the second heating component includes a plurality of heating blocks laid on the roller body.

* * * * *